(12) United States Patent
Wong et al.

(10) Patent No.: US 12,226,036 B2
(45) Date of Patent: Feb. 18, 2025

(54) TREE BRANCH CONTROL DEVICES AND METHODS

(71) Applicants: Belgravia Wood Limited, Tortola (VG); May Kong Wong, Dongguan (CN); Jaime Ramos, Moorepark, CA (US)

(72) Inventors: May Kong Wong, Dongguan (CN); Jaime Ramos, Moorepark, CA (US)

(73) Assignee: Belgravia Wood Limited, Tortola (VG)

(*) Notice: Subject to any disclaimer, the term of this patent is extended or adjusted under 35 U.S.C. 154(b) by 495 days.

(21) Appl. No.: 17/620,306

(22) PCT Filed: Jun. 18, 2020

(86) PCT No.: PCT/US2020/038445
§ 371 (c)(1),
(2) Date: Dec. 17, 2021

(87) PCT Pub. No.: WO2020/257463
PCT Pub. Date: Dec. 24, 2020

(65) Prior Publication Data
US 2022/0240705 A1  Aug. 4, 2022

(30) Foreign Application Priority Data
Jun. 18, 2019 (CN) .......................... 201920913643.3

(51) Int. Cl.
*A47G 33/06* (2006.01)
*F16G 11/10* (2006.01)

(52) U.S. Cl.
CPC .............. *A47G 33/06* (2013.01); *F16G 11/10* (2013.01)

(58) Field of Classification Search
CPC ......... A47G 33/06; F16G 11/10; A41G 1/007; F16B 2/12
See application file for complete search history.

(56) References Cited

U.S. PATENT DOCUMENTS

| | | | |
|---|---|---|---|
| 2,823,943 A * | 2/1958 | Canter ................... | F16G 11/14 292/307 R |
| 3,164,344 A | 1/1965 | Whyte | |
| 8,309,188 B2 | 11/2012 | Cheng et al. | |
| 9,101,173 B1 | 8/2015 | Loomis et al. | |
| 2007/0163804 A1 * | 7/2007 | Auray .................. | H02G 3/0691 174/666 |
| 2010/0177517 A1 * | 7/2010 | Foley ....................... | B60Q 7/02 359/549 |
| 2014/0182085 A1 | 7/2014 | Dodge | |
| 2017/0172073 A1 * | 6/2017 | Van Den Heever ... | A01G 17/04 |
| 2017/0358550 A1 * | 12/2017 | Ocegueda Gallaga ..................... | H01L 24/85 |

* cited by examiner

*Primary Examiner* — David M Upchurch
(74) *Attorney, Agent, or Firm* — Troutman Pepper Hamilton Sanders LLP; Christopher C. Close, Jr.; Haden M. Marrs

(57) ABSTRACT

The technology includes a control wire clamp for securing a control member, such as a control wire, in place. The default state of the control wire clamp may be a clamped state. The control wire clamp may be placed in an unclamped state by applying force to a clamp handle.

23 Claims, 7 Drawing Sheets

TREE BRANCH CONTROL DEVICES AND METHODS

CROSS-REFERENCE TO RELATED APPLICATIONS

This application is a national stage application, filed under 35 U.S.C. § 371, of International Patent Application No. PCT/US20/38445, filed on 18 Jun. 2020, which claims benefit under 35 U.S.C. § 119(a), of Chinese Patent App. No. 2019209136433, filed 18 Jun. 2019, the entire contents and substance of which are incorporated herein by reference in their entirety.

TECHNICAL FIELD

Aspects of the present disclosure relate to a clamp apparatus for securing control wires and, more particularly, for securing control wires used to place hinged branches of an artificial Christmas tree in a stowed position.

BACKGROUND

Clamps are well-known fastening devices that may be used to hold or secure objects tightly in place by applying inward pressure between two clamping surfaces. But existing clamp designs may not be suitable to adjustably secure a control member (e.g., a loop of wire, string, rope, twine, cord, or the like) used in an artificial tree apparatus to position and secure branches into a stowed position. Current clamp designs may fail to adequately secure a control member to maintain a stowed or deployed position of the control member, and/or current clamp designs may be cumbersome or difficult to use while creating tension or slack in a loop of the control member that may be connected to the plurality of branches. Specifically, it may be difficult to release the clamping pressure or otherwise un-cinch the control member, and it may also be difficult to apply clamping pressure or to cinch the control member. Additionally, it may be difficult to cinch or un-cinch a control member with existing clamping devices while using only a single hand, as it may be necessary to use a second hand to move the control member relative the clamping device. Further, when using a second hand to cinch the tree, a user of the clamping device may be inclined to pull the control member in an upward motion, thus upsetting the balance of the tree and creating a dangerous situation. When using a single hand, in contrast, a user is more inclined to pull the control member in a horizontal and/or lateral motion, thus allowing the tree to remain in a more stable configuration.

Therefore, there is a need for a system that can adjustably secure a control member that may be used to adjust the size of a control loop. There also is a need for a system that can be easily adjusted between a clamped position and an unclamped position. There is an additional need for a system that be easily adjusted between a clamped position and an unclamped position with the use of a single hand.

BRIEF SUMMARY OF THE INVENTION

Aspects of the present disclosure relate to a clamp apparatus for securing a control member and, more particularly, for securing control wires used to place hinged branches of an artificial Christmas tree in a stowed position. It may be desirable to connect such a control member to a plurality of branches such that the control member forms a loop that surrounds the trunk of the artificial tree apparatus. It also may be desirable to use a clamping device to transition, and maintain, the plurality of branches in a stowed position (e.g., the branches are substantially parallel to the trunk of the artificial tree) or a deployed position (e.g., the branches are substantially perpendicular to the trunk of the artificial tree).

In some embodiments, the control member may form a closed loop and the clamping device may contact the control member in two or more locations along the control member such that a larger loop is formed around the artificial tree apparatus and a smaller loop is formed on the side of the clamping mechanism opposite the artificial tree apparatus. To transition the branches to a stowed position, the smaller loop can be pulled or otherwise adjusted, which may decrease the diameter of the larger loop, forcing the tree branches from a deployed position to a stowed position. This may provide a reduction in the volume of the tree and may provide for easier storage.

In some embodiments, the control member may not be a closed loop (i.e., the control member has two unconnected ends), but the control member may be connected to the plurality of branches such that it may substantially encompass the trunk of artificial tree apparatus, which may form a looped portion of the control member. The size of the looped portion may be adjusted to a stowed position by pulling or otherwise adjusting one or both ends of the control member away from the artificial tree apparatus and cinching the control member with a clamping device to maintain the current, decreased diameter of the loop. The loop may be adjusted to a deployed position by pulling a portion of the loop away from the clamping device and cinching the control member with the clamping device to maintain the increased diameter of the loop.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE FIGURES

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
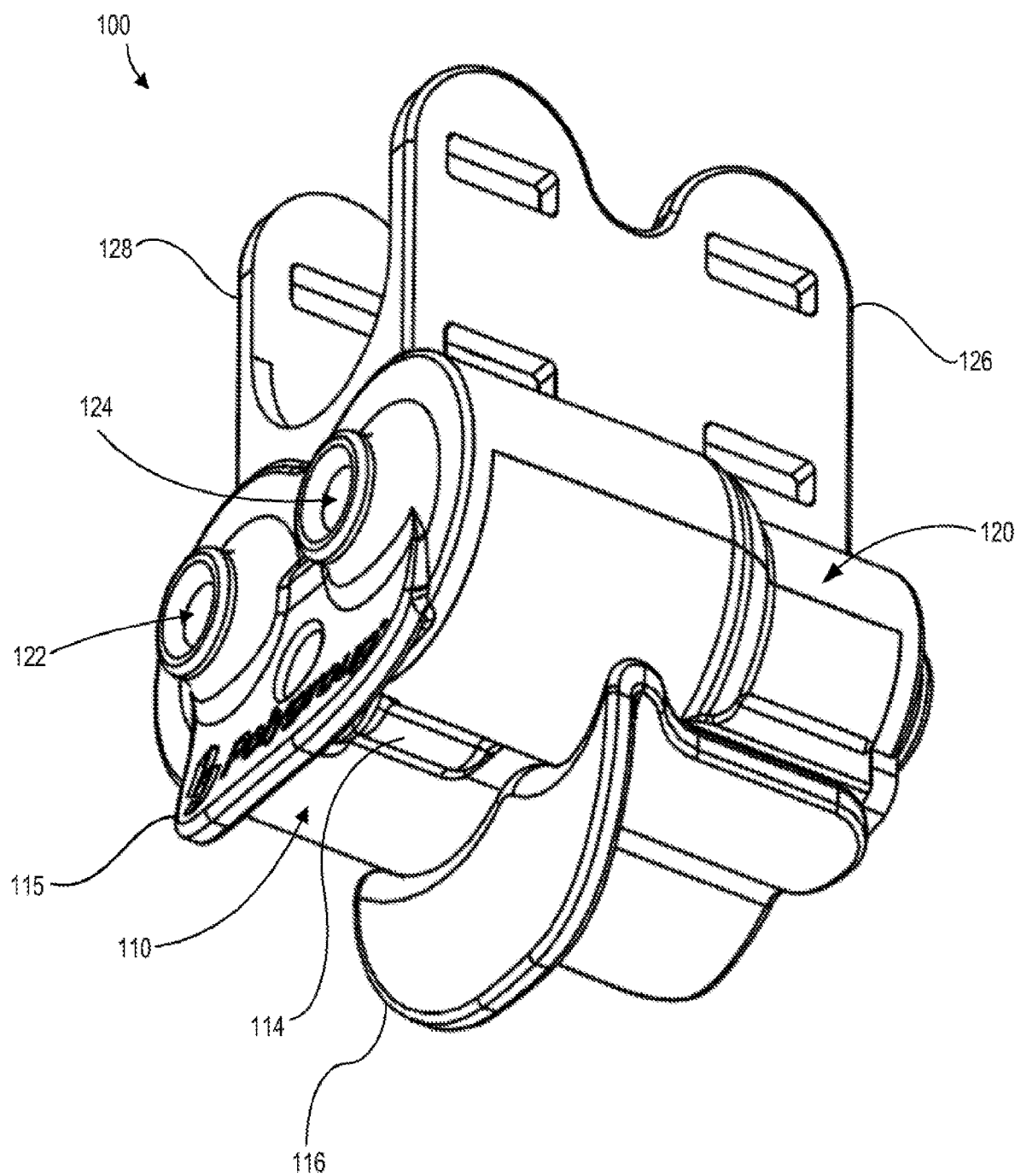
FIG. 1 is a perspective view of a control wire clamp, in accordance with some embodiments of the presently disclosed subject matter.

The present disclosure can be understood more readily by reference to the following detailed description of exemplary embodiments and the examples included herein. Before the exemplary embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described must be in a given sequence, either temporally, spatially, in ranking, or in any other manner.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, example embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the disclosed technology, for example.

Embodiments of the disclosed technology include a control wire clamp for securing a control member in place. In various embodiments, a control wire clamp may be used to adjustably secure a control member configured to be tightened around an artificial Christmas tree to drive the tree's branches upwards into a stowed position to facilitate ease of storage. In some embodiments, the control wire clamp may have two states—a clamped state and an unclamped state. In the clamped state, a wire locker may exert a clamping force (via tension) on the control member, securing it in place. In the unclamped state, a user may apply force to a clamp handle to compress the wire locker, which in turn may release the tension and clamping force on the control member, thereby allowing the control member to be pulled through the channels of the body of the control wire clamp in either a forward or reverse direction. In some embodiments, the wire locker in the clamped state may allow the control member to be pulled through in the tightening (i.e. forward) direction but may be prevented from moving in the releasing (i.e. reverse) direction. Such an embodiment would allow the control member to be tightened simply by pulling an end of the control member but would require a user to apply force to the clamp handle to compress the wire locker and release the control member, thus improving the security of the tree branches and reducing the number of hands required by the user to use the device. According to some embodiments, the control wire clamp may rest in the clamped state by default.

As will be understood, a control member may comprise a first portion (i.e., a loop) that encompasses the tree and then feeds through the control wire clamp to provide a second portion for user engagement. This second portion may be a second, smaller loop, or first and second wire ends, which are unconnected. The second portion additionally may comprise a handle tube to improve the grip of the user and reduce the stress and forces on the control member. In some embodiments, the second portion can comprise a first and a second wire end configured to detachably attach to one another, allowing the user to optionally create a second loop or leave the wires unconnected. When the control wire clamp is in the unclamped state, a user can pull the second portion through the control wire clamp and away from the tree, which can cause the first portion (i.e., the control loop) to tighten around the Christmas tree. As explained, in some embodiments, the first portion of the control member may form a control loop around a plurality of tree branches, making contact with the underside of each branch. In some embodiments, the control wire clamp may be mounted on a branch from the plurality of tree branches. Tightening the control member (i.e., pulling the second portion through the control wire clamp and away from the tree) may cause the branches, which may initially be in a generally horizontal position, to rotate into a generally vertical position. The branches may be hingedly attached to the trunk of the artificial Christmas trees, thus allowing the branches to rotate from deployed to stowed positions upon tightening of the control member. When the tree branches are in the desired position for storage, a user may release force on the clamp handle (i.e., return the control wire clamp to the clamped state) thus clamping or securing the control member so that the branches of the artificial tree may remain in a generally vertical position for storage.

Throughout this disclosure, certain embodiments are described in exemplary fashion in relation to securing a tightened control member of an artificial Christmas tree. But embodiments of the disclosed technology are not so limited. In some embodiments, the disclosed technique may be effective in securing control members comprising, for example, one or two wires or wire segments, that may be used to control and/or secure other objects.

Figure 2:
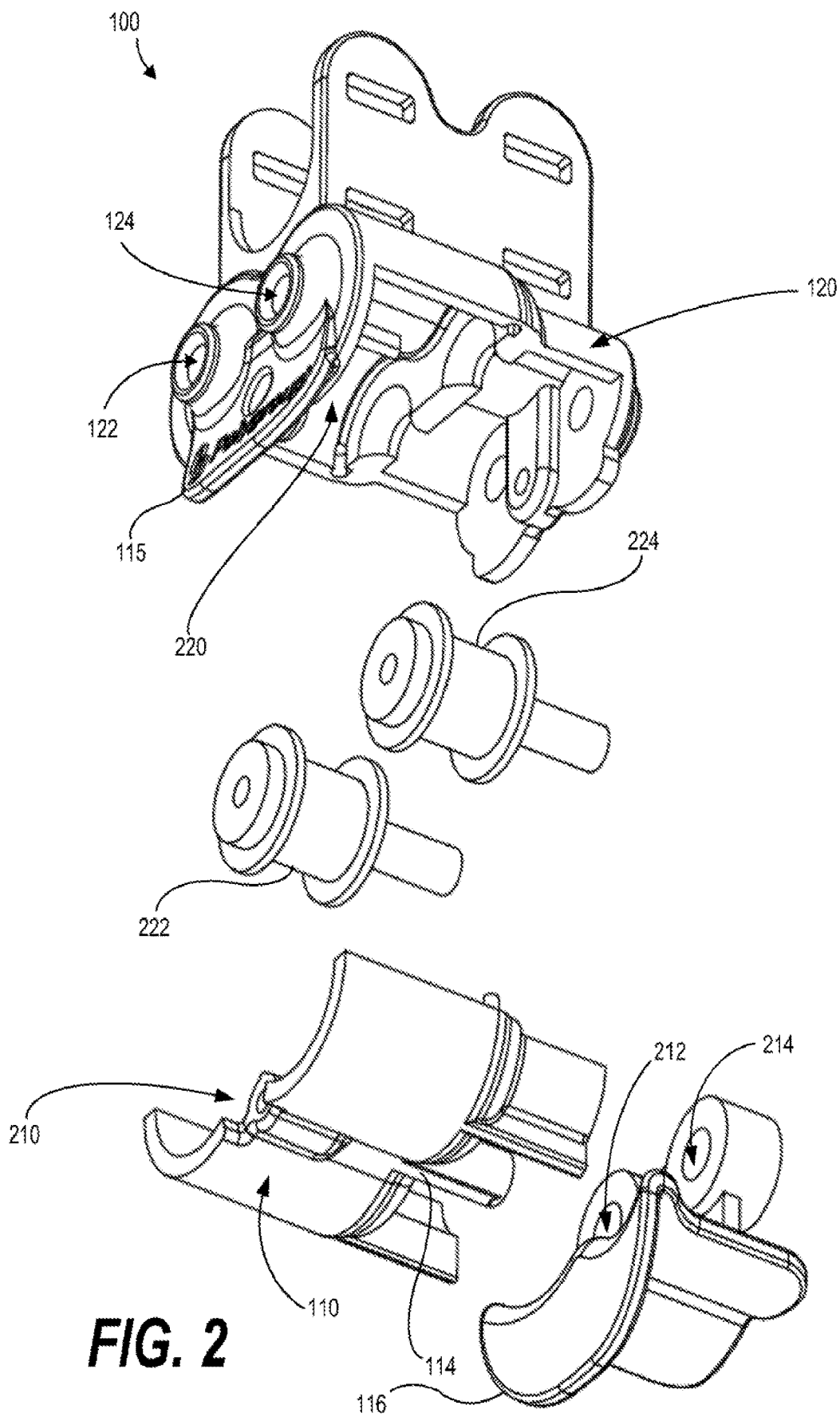
FIG. 2 is an exploded view of a control wire clamp, in accordance with some embodiments of the presently disclosed subject matter.

Referring now to the drawings, FIGS. 1 and 2 are embodiments of a control wire clamp 100. As described above, control wire clamp 100 may be used to secure control member 118 (shown in FIG. 3A) in place when control wire clamp 100 is in a clamped state. In some embodiments, control wire clamp 100 can comprise lower cabinet 110 and upper cabinet 120. The control member (not shown) may enter control wire clamp 100 via at least one aperture (e.g., 122, 124) in upper cabinet 120. As shown according to some embodiments, upper cabinet 120 may comprise a first aperture 122 and a second aperture 124 to receive the control member. Upper cabinet 120 may have a first mounting member 128 and a second mounting member 126 disposed thereon. Lower cabinet 110 may comprise a clamp handle disposed thereon. According to some embodiments, the clamp handle may have a stationary end 115 and a clamping end 116. Clamping end 116 may be slidably disposed on lower cabinet 110 and configured to slide toward or away from stationary end 115. For example, clamping end 116 may be disposed on tracks 114 to improve the ability to move toward stationary end 115. According to some embodiments, the clamp handle may have a first (i.e., neutral) position and a second (i.e., open) position. A user can transition the clamp handle from the first position to the second position by sliding clamping end 116 towards stationary end 115 along track 114. When the clamping end 116 is released, the clamp handle may automatically revert to the first position. In some embodiments, the first or neutral position may be a clamped state, while the second or open position may be a released state.

In some embodiments, the locking or clamping action can be provided by one or more wire lockers, shown in FIG. 2 as first wire locker 222 and second wire locker 224. The one or more wire lockers may be configured to alternate between a clamped state when under tension and a released state when under compression. In other words, the wire lockers may clamp the control member in a default state of tension and can release the control member when an outside force puts the wire lockers under compression. As shown, the one or more wire lockers may be housed in upper recess 220, lower recess 210, or a combination thereof. As such, the one or more wire lockers may be substantially enclosed by upper cabinet 120 and lower cabinet 110 to form control wire clamp 100.

According to some embodiments, the state of the one or more wire lockers (222, 224) may be controlled by one or more clamp channels (212, 214). The number of clamp channels may correspond with the number of wire lockers present. For example, as shown, two wire lockers 222 and 224 may be controlled by two clamp channels 212 and 214. The clamp channels 212 and 214 may be attached to clamping end 116 such that any movement of clamping end 116 will subsequently move clamp channels 212 and 214. Clamp channels 212 and 214 can contact wire lockers 222 and 224 in the neutral position and, due to pressure applied to clamping end 116, compress wire lockers 222 and 224 from the clamped state to the released state. As such, it is understood that the control member wires may travel through control wire clamp 100 by first entering apertures 122 and 124, passing through wire lockers 222 and 224, and exiting via clamp channels 212 and 214. Additionally, the wire lockers may provide sufficient tension such that when not under compression (i.e., not compressed by a user engaging clamping end 116), the wire lockers may return to the clamped state. As discussed, the clamped state of the wire lockers may prevent any movement of the control member. But it is understood that the wire lockers may provide for uni-directional movement to tighten the control member while preventing any reverse movement.

Figure 4:
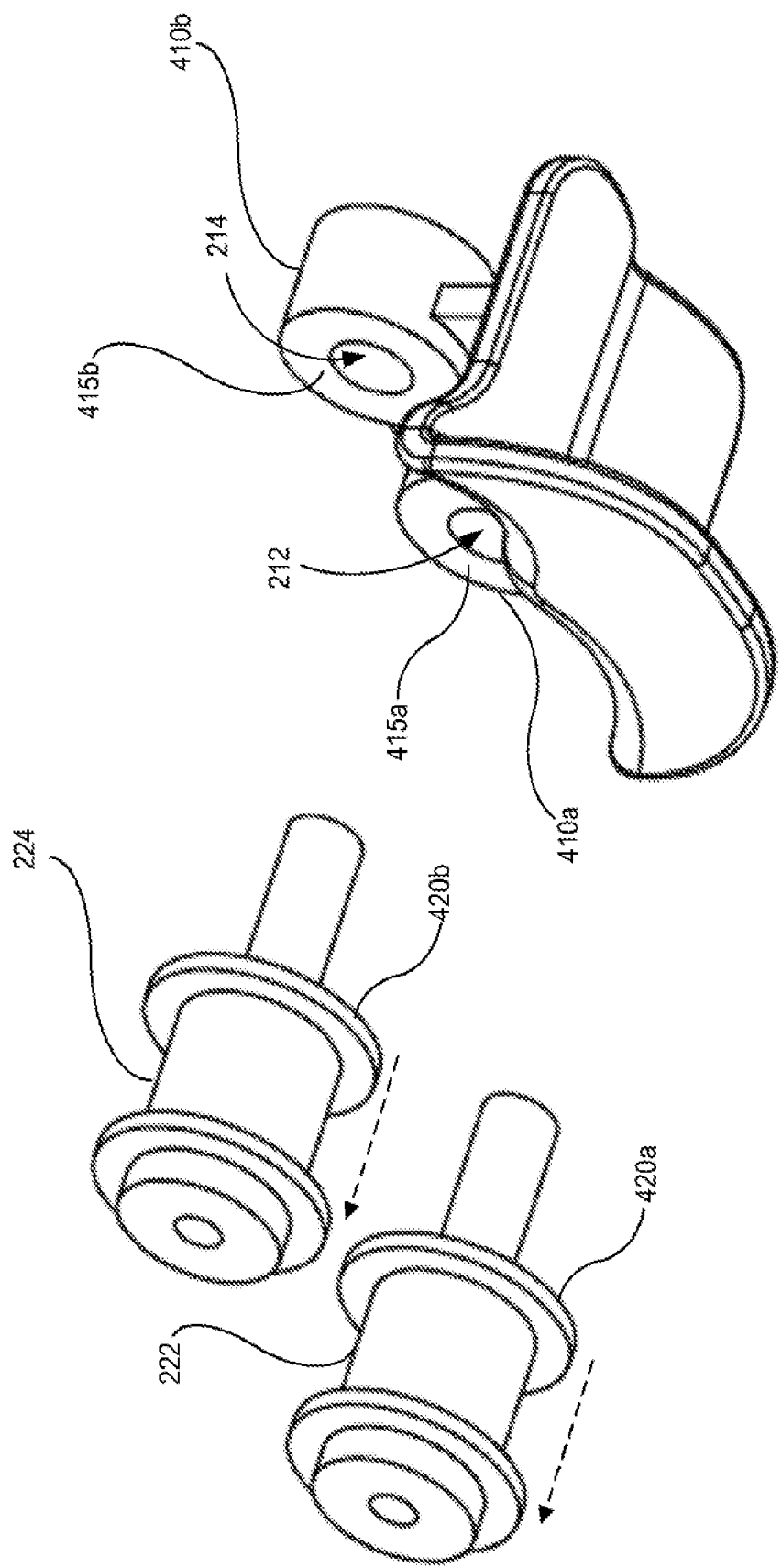
FIG. 4 is an exploded view of a control wire clamp, in accordance with some embodiments of the presently disclosed subject matter.

FIG. 4 further illustrates a wire locking mechanism according to some embodiments of the present disclosure. As shown, wire lockers 222 and 224 may be capable of transitioning between a first (i.e., neutral) position and a second (i.e., open) position, as illustrated by the dashed arrows. To transition wire lockers 222 and 224 from the first to the second position, clamping plates 410a and 410b may contact wire lockers 222 and 224, respectively, using contacting faces 415a and 415b. A movement of clamping plates 410a and 410b may apply a pressure to wire lockers 222 and 224 through contacting faces 415a and 415b to transition wire lockers 222 and 224 from the first to the second position. When clamping plates 410a and 410b are not applying a pressure to wire lockers 222 and 224, wire lockers 222 and 224 may revert or transition back to the first position. Clamping plates 410a and 410b may further comprise clamp channels 212 and 214 to allow a control wire member (not shown) to pass through clamping plates 410a and 410b. Wire lockers 222 and 224 may further comprise compression faces 420a and 420b. In some embodiments, compression faces 420a and 420b may have a larger diameter than wire lockers 222 and 224 in order to improve the contact area for contacting faces 415a and 415b. When contacted by contacting faces 415a and 415b, compression faces 420a and 420b may compress wire lockers 222 and 224. In some embodiments, compression faces 410a and 420b may be disposed on wire lockers 222 and 224.

Figure 3A:
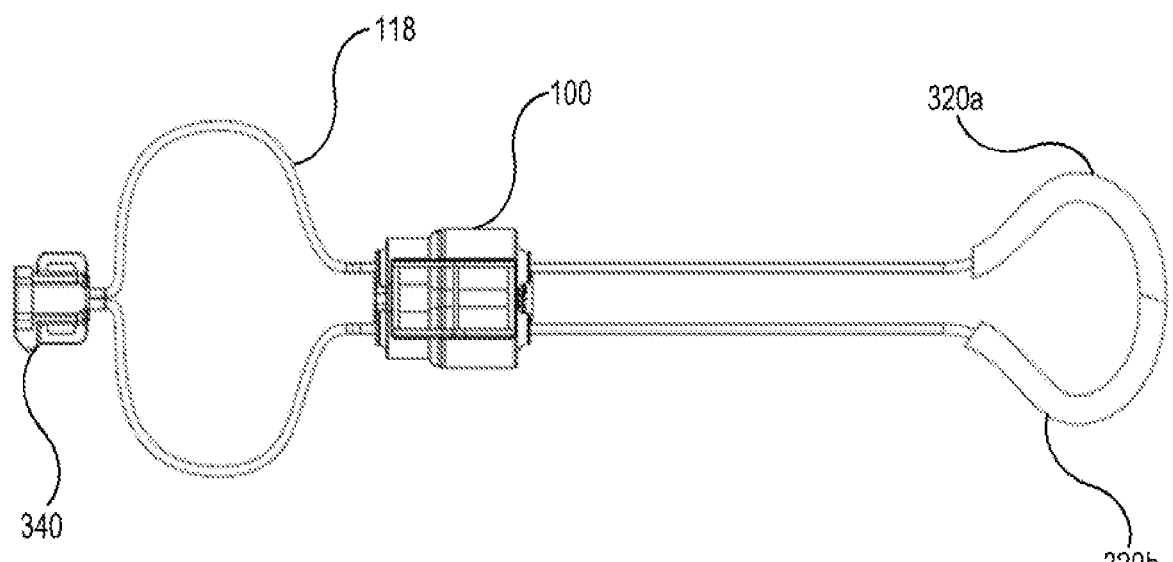
FIG. 3A is a top-down view of a control wire clamp and control member in a clamped state, in accordance with some embodiments of the presently disclosed subject matter.
Figure 3B:
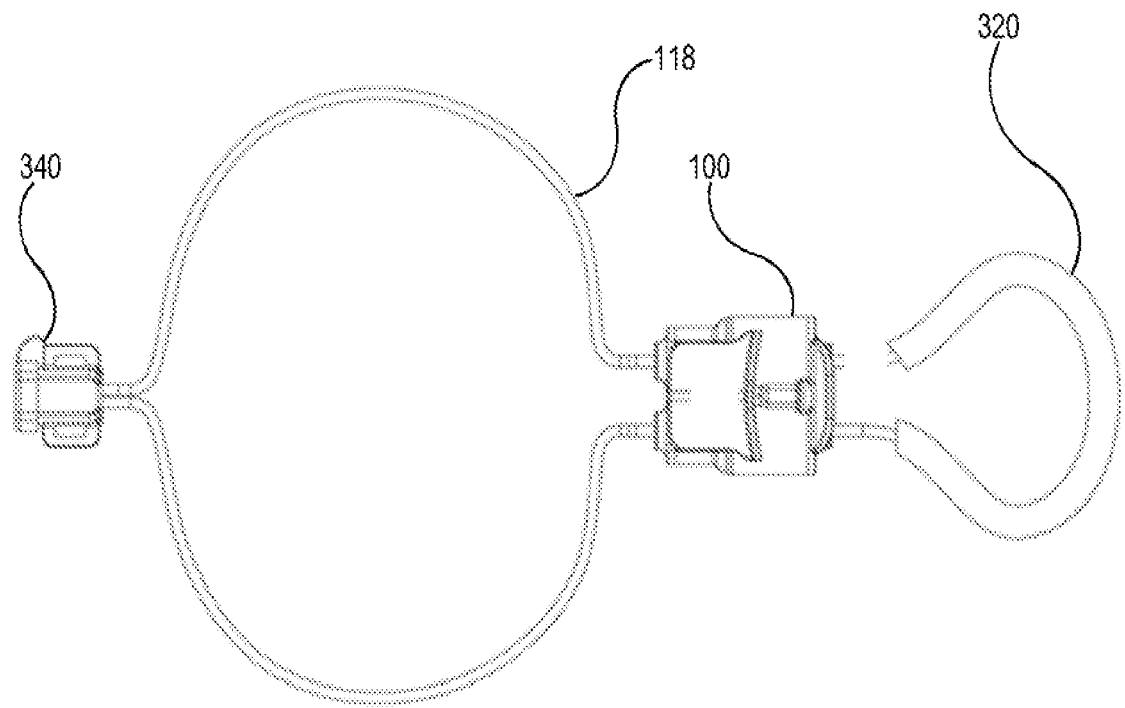
FIG. 3B is a bottom-up view of a control wire clamp and control member in an unclamped state, in accordance with some embodiments of the presently disclosed subject matter.

FIG. 3A shows control wire clamp 100 and control member 118 in the clamped state, and FIG. 3B shows control wire clamp 100 and control member 118 in the unclamped state. Control member 118 may generally have a first portion that is positioned on a first side of control wire clamp 100 (e.g., the portion of control member 118 that loops around a Christmas tree's branches) and a second portion that is positioned on a second side of control wire clamp 100 (e.g., the portion of control member 118 with which the user engages to tighten or loosen the first portion of control member 118). The amount of the portion of control member 118 that is positioned on the first or second sides of control wire clamp 100 may be adjusted by pulling control member 118 in either a forward or reverse direction. As such, control wire clamp 100 may allow control member 118 to be drawn through the body of control wire clamp 100 in a forward or reverse direction when in an unclamped state. Accordingly, control member 118 may be adjusted to the desired length, position, or tension when control wire clamp 100 is in the unclamped state, and then may be tightly secured in the desired position by returning control wire clamp 100 to the clamped position. According to some embodiments, a control member 118 may be a flexible rod, a wire, a string, a rubber band, a piece of elastic material, or any other material that may capable of forming a loop of adjustable diameter.

In some embodiments, control member 118 may have a control member tab 320, as shown in FIG. 3B, at one end that provides a surface that a user may order to more easily pull the control member 118 away from the control wire clamp 100 (e.g., to tighten the loop on the opposing side of the control wire clamp 100). In some embodiments, control member tab 320 may be in the form of a control member loop. For instance, control member 118 may comprise one continuous closed-loop wire wherein control member tab 320 can be a section of padding and/or insulation, as shown in FIG. 3B. Alternatively, control member 118 can comprise two separate wires that do not form a closed loop. Control member tab 320 may be two sections (320a and 320b) of padding/insulation on each of the separate wires. Additionally, control member tab 320 may provide means for attaching the two sections 320a and 320b together at control member tab 320, as shown in FIG. 3A. Such means for attachment can be magnetic, adhesive, glue, and the like. The two sections 320a and 320b may be attached and detached as desired by the user.

Although this disclosure is directed toward a control member 118 wherein the first portion forms a loop such that the control member 118 passes through the control wire clamp 100 in two places (i.e., two segments of the control member 118 pass through the control wire clamp 100, as shown in FIGS. 1 and 2), it should be understood that in some embodiments, the portion of the control member 118 that is on the second side of the control wire clamp 100 may not form a loop.

Figure 6A:
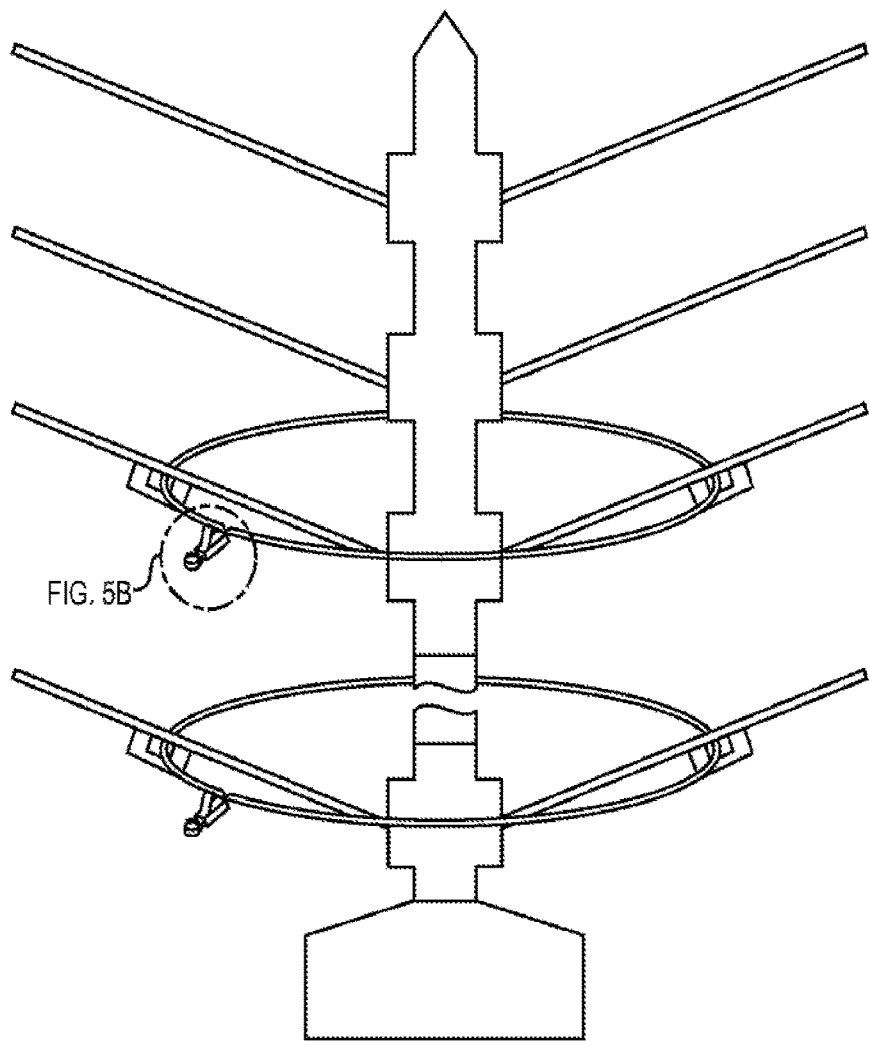
FIG. 6A is a perspective view of a control wire clamp and control member in use with an artificial tree in a deployed position, in accordance with some embodiments of the presently disclosed subject matter.
Figure 6B:
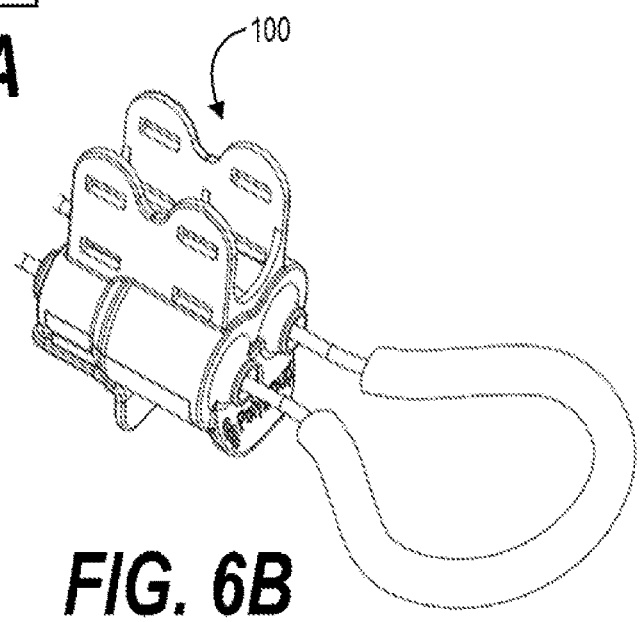
FIG. 6B is an up-close view of a control wire clamp when in use with an artificial tree in a deployed position, in accordance with some embodiments of the presently disclosed subject matter.
Figure 7:
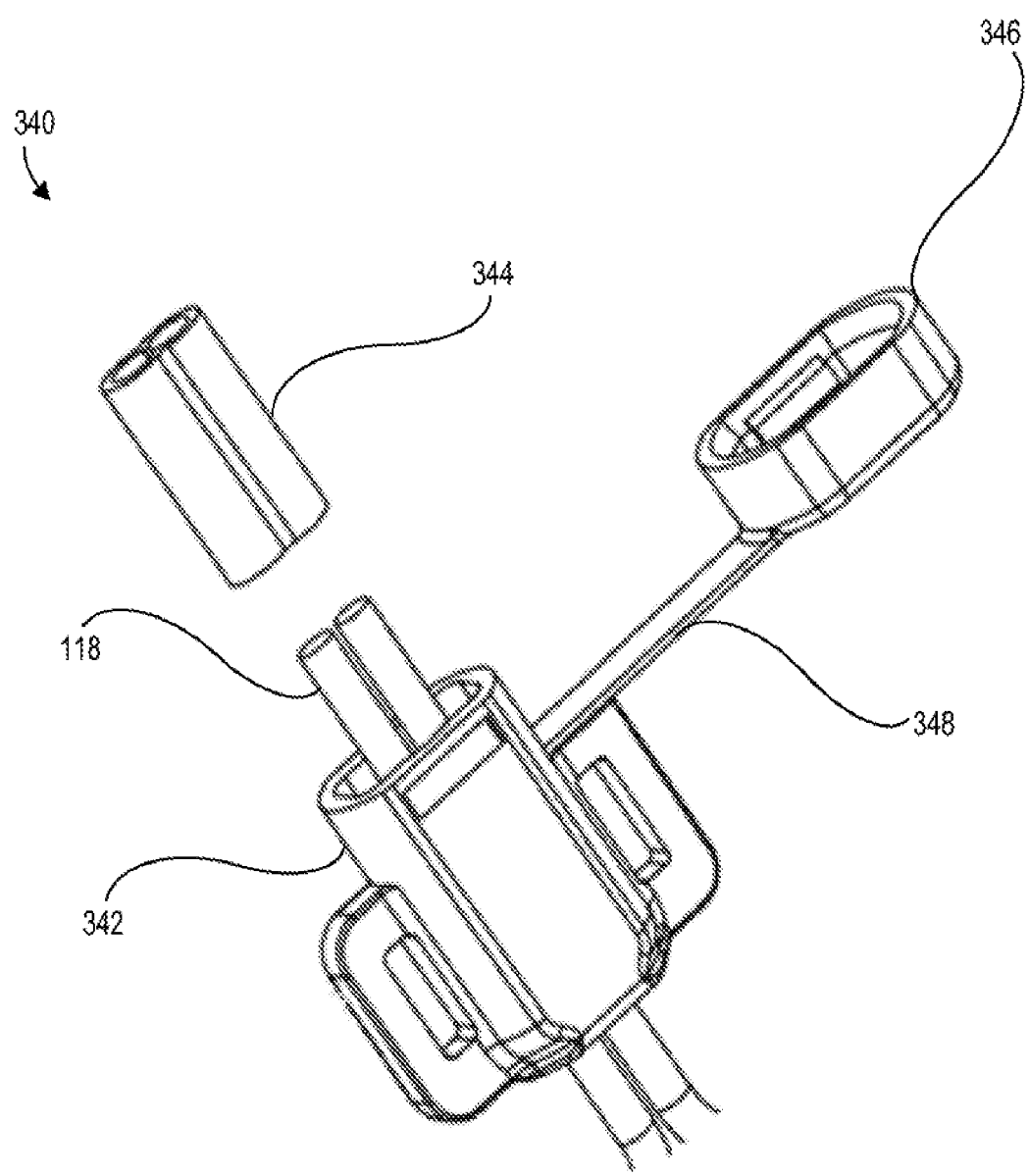
FIG. 7 is a perspective view of a wire end lock when in use with a control member, in accordance with some embodiments of the presently disclosed subject matter.

Additionally, on an end of control member 118 opposite to the control member tab 320, control member 118 may have a wire end lock 340 as shown in FIGS. 3A and 3B. As shown in FIG. 6, wire end lock 340 may comprise locking chamber 342, sealing element 344, and a cap 346 connected thereto by connecting member 348. Wire end lock 340 may seal the end of control member 118 in place and may complete the loop to secure control member 118 to an artificial tree. Sealing element 344 can be in the form of a flexible gasket or gasket-like member operable to seal control member 118 in locking chamber 342. Sealing element 344 may comprise any material able to fill the volume of locking chamber 342. In some embodiments, sealing element 344 can comprise a flexible plastic material, an elastomeric material, a thermoplastic material, rubber, and the like. Additionally, sealing element can be configured to receive multiple wires of the control member 118, such as one wire, two wires, or more. Connecting member 348 can be a flexible or hinged member configured to bring cap 346 in contact with locking chamber 342. Cap 346 may detachably attach to locking chamber 342 through a friction fit, interference fit, screw threading, and the like. Such an embodiment would provide for a loop to be formed with control member 118 top substantially surround the artificial tree when in use.

Figure 5A:
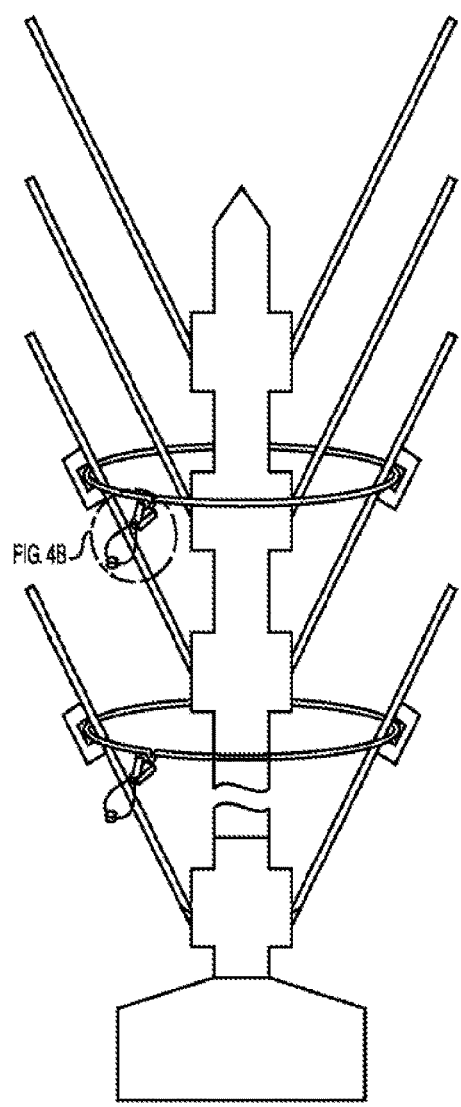
FIG. 5A is a perspective view a control wire clamp and control member in use with an artificial tree in a stowed position, in accordance with some embodiments of the presently disclosed subject matter.
Figure 5B:
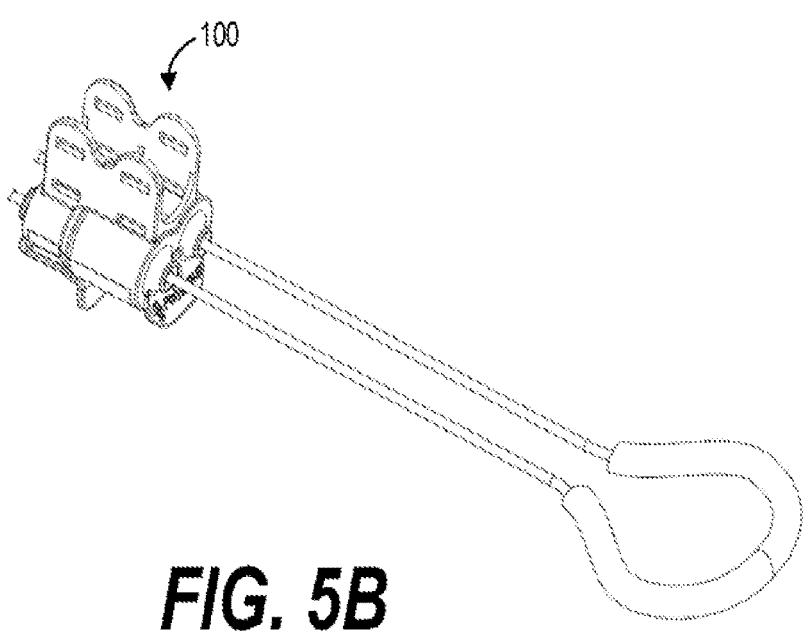
FIG. 5B is an up-close view of a control wire clamp when in use with an artificial tree in a stowed position, in accordance with some embodiments of the presently disclosed subject matter.

FIGS. 4A, 4B, 5A, and 5B depict a control wire clamp 100 in use with an artificial tree. FIGS. 5A and 5B show the control wire clamp 100 in a clamped state, while the branches of the artificial tree are in the deployed position. As shown in FIG. 5B, only a small portion of the control member 118 is positioned in front of the control wire clamp 100 (i.e., in the second position). FIGS. 4A and 4B show the control wire clamp 100 in the clamped state and the artificial tree in the stowed position. To transition from the position depicted in FIG. 4 to the position depicted in FIG. 5 (or vice versa), the control wire clamp 100 can be placed in the unclamped state; the control member 118 can be pulled in a forward or reverse direction, tightening or loosening the loop around the branches; and the control wire clamp 100 can be returned to the clamped position, securing the branches along the trunk of the artificial tree. In some embodiments, as can be seen from FIGS. 4B and 5B, a substantially greater portion of the control member 118 can be positioned in front of the control wire clamp 100 in FIG. 4B (i.e., when the tree is in the stowed position) than in FIG. 5B (i.e., when the tree is in the deployed position). Furthermore, it can be seen in FIG. 4A that the tree branches can be forced into a generally vertical position (i.e., generally parallel to the trunk of the artificial tree) by the control member 118 such that the artificial tree may be more easily stored, as compared to the position depicted in FIG. 5A.

Also disclosed herein are methods of using a control wire clamp. As would be appreciated by one of ordinary skill in the art, the following method can provide of the assembly and/or disassembly of an artificial tree. For example, an artificial tree can be provided comprising one or more trunk sections. Each of the one or more trunk sections may have a plurality of branches, as described above. The plurality of branches may be radially disposed on the trunk sections using hinges, or other known methods of flexible connection. In some embodiments, wire lock end 340 and control wire clamp 100, shown in FIGS. 3A and 3B, may be mounted on branches from the plurality of branches. An artificial tree may start in the stowed position (i.e. all branches are generally vertical and parallel to the tree trunk) with control member 118 substantially taught around the plurality of branches. A user of the artificial tree may then transition the tree from the stowed position to the deployed position by moving clamping end 116 of the clamp handle towards stationary end 115 to release control member 118. As would be appreciated, the release of control member 118 would allow the plurality of branches to fall substantially perpendicular to the tree trunk in the deployed position.

To transition the tree from the deployed position to the stowed position, a user of the tree may pull control member tab 320 (shown in FIG. 3A) to tighten control member 118 around the plurality of branches. It will be understood that this method of use is provided by way of example and not limitation, and that other methods of use are apparent to one of ordinary skill in the art upon reading this disclosure.

An embodiment of the present disclosure can be implemented according to at least the following:

Clause 1: A tree branch control device comprising: a control wire clamp configured to be attached to an artificial tree; a control member configured to pass through the control wire clamp, the control member configured to be disposed around the artificial tree; a control member tab attached to a first end of the control member; and a wire end lock attached to the control member at a second end opposite the first end and configured to be attached to the artificial tree.

Clause 2: The device of Clause 1, wherein the control member comprises one or more wires arranged to form one or more loops.

Clause 3: The device of Clause 2, wherein the control member comprises a first loop formed between the wire end lock and the control wire clamp, and a second loop formed between the control wire clamp and the control member tab.

Clause 4: The device of Clause 1, wherein the control wire clamp comprises: an upper cabinet with one or more mounting members disposed thereon, the mounting members configured to attach the control wire clamp to a portion of the artificial tree; a lower cabinet configured to attach to the upper cabinet; and a clamp handle comprising a clamping end and a stationary end.

Clause 5: The device of Clause 4, wherein the control wire clamp further comprises a chamber formed between the upper cabinet and the lower cabinet configured to house one or more wire lockers.

Clause 6: The device of Clause 5, wherein the one or more wire lockers are configured to transition between a first position and a second position.

Clause 7: The device of Clause 6, wherein the control wire clamp is configured such that moving the clamping end of the clamp handle towards the stationary end of the clamp handle moves the one or more wire lockers from the first position to the second position.

Clause 8: The device of Clause 7, wherein the first position corresponds to a tensioned state wherein the one or more wire lockers are clamped on the control member.

Clause 9: The device of Clause 7, wherein the second position corresponds to a released state wherein the one or more wire lockers are not in contact with the control member.

Clause 10: The device of Clause 7, wherein the one or more wire lockers are tensioned such that they are configured to return to the first position when the clamp handle is disengaged.

Clause 11: A tree branch control device comprising: a control wire clamp, the control wire clamp comprising: an upper cabinet with one or more mounting members disposed thereon, the mounting members configured to attach the control wire clamp to the artificial tree; a lower cabinet configured to attach to the upper cabinet and forming a chamber therebetween; one or more wire lockers housed within the chamber, each wire locker having a first position and a second position; and a clamp handle comprising a clamping end and a stationary end, wherein the tree branch control device is configured such that moving the clamping end of the clamp handle towards the stationary end of the clamp handle causes the one or more wire lockers from the first position to the second position.

Clause 12: The device of Clause 11, wherein the first position corresponds to a tensioned state wherein the one or more wire lockers are clamped.

Clause 13: The device of Clause 11, wherein the second position corresponds to a released state wherein the one or more wire lockers are not in contact with a control member.

Clause 14: The device of Clause 11, wherein the one or more wire lockers are tensioned such that they are configured to return to the first position when the clamp handle is disengaged.

Clause 15: The device of claim 11, further comprising: a control member configured to pass through the one or more wire lockers, the control member configured to substantially surround the artificial tree; a control member tab attached to a first end of the control member; and a wire end lock attached to the artificial tree distal the control wire clamp, the wire end lock further attached to the control member at a second end opposite the first end.

Clause 16: The device of Clause 15, wherein the one or more wire lockers are configured to clamp and restrain the control member in the first position, and wherein the one or more wire lockers are configured to release the control member in the second position.

Clause 17: The device of Clause 15, wherein the control member comprises one or more wires configured to form one or more loops.

Clause 18: The device of Clause 17, wherein the control member comprises a first loop formed between the wire end lock and the control wire clamp, and a second loop formed between the control wire clamp and the control member tab.

Clause 19: A tree branch control device comprising: a control wire clamp configured to attach to an artificial tree, the control wire clamp comprising: one or more wire lockers housed within the chamber, each wire locker having a neutral position and a second position; and a clamp handle comprising a clamping end and a stationary end, wherein moving the clamping end of the clamp handle towards the stationary end of the clamp handle moves each of the one or more wire lockers from the neutral position to the second position; and a control member configured to pass through the one or more wire lockers, the control member configured to substantially surround the artificial tree.

Clause 20: The device of Clause 19, wherein the control wire clamp further comprises: an upper cabinet with one or more mounting members disposed thereon, the mounting members configured to attach the control wire clamp to the artificial tree; and a lower cabinet configured to attach to the upper cabinet and forming a chamber therebetween, wherein the one or more wire lockers are disposed in the chamber.

Clause 21: The device of Clause 19, wherein the neutral position corresponds to a tensioned state wherein the one or more wire lockers are clamped to the control member, allowing the control member to be pulled in a first direction to tighten the control member around the artificial tree.

Clause 22: The device of Clause 21, wherein the second position corresponds to a released state wherein the one or more wire lockers release the control member, allowing the control member to be pulled in a reverse direction opposite the first direction Clause 23: The device of Clause 21, wherein the one or more wire lockers are configured to return to the neutral position when the clamp handle is disengaged.

Clause 24: The device of claim 19, further comprising: a control member tab attached to a first end of the control member; and a wire end lock attached to the artificial tree distal the control wire clamp, the wire end lock further attached to the control member at a second end opposite the first end.

Clause 25: The device of Clause 19, wherein the control member comprises one or more wires configured to form one or more loops.

Clause 26: The device of Clause 25, wherein the control member comprises a first loop formed between the wire end lock and the control wire clamp, and a second loop formed between the control wire clamp and the control member tab.

Clause 27: The device of Clause 19, wherein the tree branch control device is attached about an artificial tree such that tightening the control member transitions the artificial tree from a deployed configuration to a stowed configuration.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tree branch control device comprising:
   a control wire clamp configured to be attached to an artificial tree;
   a control member configured to pass through the control wire clamp, the control member configured to be disposed around the artificial tree;
   a control member tab attached to a first end of the control member; and
   a wire end lock attached to the control member at a second end opposite the first end and configured to be attached to the artificial tree,
   wherein the control member comprises a first loop formed between the wire end lock and the control wire clamp, and a second loop formed between the control wire clamp and the control member tab.

2. The device of claim 1, wherein the control wire clamp comprises:
   an upper cabinet with one or more mounting members disposed thereon, the mounting members configured to attach the control wire clamp to a portion of the artificial tree;
   a lower cabinet configured to attach to the upper cabinet; and
   a clamp handle comprising a clamping end and a stationary end.

3. The device of claim 2, wherein the control wire clamp further comprises a chamber formed between the upper cabinet and the lower cabinet configured to house one or more wire lockers.

4. The device of claim 3, wherein the one or more wire lockers are configured to transition between a first position and a second position.

5. The device of claim 4, wherein the control wire clamp is configured such that moving the clamping end of the clamp handle towards the stationary end of the clamp handle moves the one or more wire lockers from the first position to the second position.

6. The device of claim 5, wherein the first position corresponds to a tensioned state wherein the one or more wire lockers are clamped on the control member.

7. The device of claim 5, wherein the second position corresponds to a released state wherein the one or more wire lockers are not in contact with the control member.

8. The device of claim 5, wherein the one or more wire lockers are tensioned such that they are configured to return to the first position when the clamp handle is disengaged.

9. A tree branch control device comprising:
   a control wire clamp, the control wire clamp comprising:
      an upper cabinet with one or more mounting members disposed thereon, the mounting members configured to attach the control wire clamp to an artificial tree;
      a lower cabinet configured to attach to the upper cabinet and forming a chamber therebetween;
      one or more wire lockers housed within the chamber, each wire locker having a first position and a second position;
      a clamp handle comprising a clamping end and a stationary end;
   a control member configured to pass through the one or more wire lockers, the control member configured to substantially surround the artificial tree;
   a control member tab attached to a first end of the control member; and
   a wire end lock attached to the artificial tree distal the control wire clamp, the wire end lock further attached to the control member at a second end opposite the first end,
   wherein the tree branch control device is configured such that moving the clamping end of the clamp handle towards the stationary end of the clamp handle causes the one or more wire lockers from the first position to the second position.

10. The device of claim 9, wherein the first position corresponds to a tensioned state wherein the one or more wire lockers are clamped.

11. The device of claim 9, wherein the second position corresponds to a released state wherein the one or more wire lockers are not in contact with a control member.

12. The device of claim 9, wherein the one or more wire lockers are tensioned such that they are configured to return to the first position when the clamp handle is disengaged.

13. The device of claim 9, wherein the one or more wire lockers are configured to clamp and restrain the control member in the first position, and wherein the one or more wire lockers are configured to release the control member in the second position.

14. The device of claim 9, wherein the control member comprises one or more wires configured to form one or more loops.

15. The device of claim 14, wherein the control member comprises a first loop formed between the wire end lock and the control wire clamp, and a second loop formed between the control wire clamp and the control member tab.

16. A tree branch control device comprising:
   a control wire clamp configured to attach to an artificial tree, the control wire clamp comprising:

one or more wire lockers housed within a chamber, each wire locker having a neutral position and a second position; and a clamp handle comprising a clamping end and a stationary end, wherein moving the clamping end of the clamp handle towards the stationary end of the clamp handle moves each of the one or more wire lockers from the neutral position to the second position;

a control member configured to pass through the one or more wire lockers, the control member configured to substantially surround the artificial tree;

a control member tab attached to a first end of the control member; and a wire end lock attached to the artificial tree distal the control wire clamp, the wire end lock further attached to the control member at a second end opposite the first end.

17. The device of claim 16, wherein the control wire clamp further comprises:

an upper cabinet with one or more mounting members disposed thereon, the mounting members configured to attach the control wire clamp to the artificial tree; and a lower cabinet configured to attach to the upper cabinet and forming a chamber therebetween, wherein the one or more wire lockers are disposed in the chamber.

18. The device of claim 16, wherein the neutral position corresponds to a tensioned state wherein the one or more wire lockers are clamped to the control member, allowing the control member to be pulled in a first direction to tighten the control member around the artificial tree.

19. The device of claim 18, wherein the second position corresponds to a released state wherein the one or more wire lockers release the control member, allowing the control member to be pulled in a reverse direction opposite the first direction.

20. The device of claim 18, wherein the one or more wire lockers are configured to return to the neutral position when the clamp handle is disengaged.

21. The device of claim 16, wherein the control member comprises one or more wires configured to form one or more loops.

22. The device of claim 16, wherein the control member comprises a first loop formed between the wire end lock and the control wire clamp, and a second loop formed between the control wire clamp and the control member tab.

23. The device of claim 16, wherein the tree branch control device is attached about an artificial tree such that tightening the control member transitions the artificial tree from a deployed configuration to a stowed configuration.

* * * * *